(12) United States Patent
Harrah et al.

(10) Patent No.: US 10,602,751 B2
(45) Date of Patent: Mar. 31, 2020

(54) COUNTERTOP PRODUCE-PRESERVATION DEVICE HAVING SELECTIVELY-REMOVABLE SHELVES

(71) Applicant: Haier US Appliance Solutions, Inc., Wilmington, DE (US)

(72) Inventors: Symon James Harrah, Louisville, KY (US); Daniel Carballo, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 166 days.

(21) Appl. No.: 15/941,365

(22) Filed: Mar. 30, 2018

(65) Prior Publication Data

US 2019/0297907 A1 Oct. 3, 2019

(51) Int. Cl.
| | | |
|---|---|---|
| *A23B 7/04* | (2006.01) | |
| *F25D 25/02* | (2006.01) | |
| *F25D 23/10* | (2006.01) | |

(52) U.S. Cl.
CPC ............ *A23B 7/0425* (2013.01); *F25D 23/10* (2013.01); *F25D 25/02* (2013.01); *A23V 2002/00* (2013.01); *F25D 2500/06* (2013.01)

(58) Field of Classification Search
CPC . A23V 2002/00; F25D 2500/06; F25D 23/10; F25D 25/02; A23B 7/0425
See application file for complete search history.

(56) References Cited

U.S. PATENT DOCUMENTS

| | | | |
|---|---|---|---|
| 5,901,848 A | 5/1999 | Gorlich et al. | |
| 5,918,480 A * | 7/1999 | Nagata | B22F 3/1137 62/440 |
| 6,170,276 B1 | 1/2001 | Mandel et al. | |
| 6,343,477 B1 | 2/2002 | Mandel et al. | |
| 6,612,116 B2 | 9/2003 | Fu et al. | |
| 6,840,982 B2 | 1/2005 | Kunstadt et al. | |
| 7,296,422 B2 | 11/2007 | Strohm et al. | |
| 9,255,729 B2 * | 2/2016 | Rindlisbach | F25D 25/027 |
| 9,989,300 B1 * | 6/2018 | Shuntich | F25D 29/00 |
| 2006/0130498 A1 | 6/2006 | Joshi et al. | |
| 2010/0221393 A1 | 9/2010 | Lim | |
| 2011/0126565 A1 * | 6/2011 | Tsuruma | C12M 41/14 62/159 |

FOREIGN PATENT DOCUMENTS

JP H08285444 A 11/1996

* cited by examiner

*Primary Examiner* — Ana M Vazquez
(74) *Attorney, Agent, or Firm* — Dority & Manning, P.A.

(57) ABSTRACT

A countertop produce-preservation device is provided herein. The countertop produce-preservation device may include a housing, a refrigeration system, and one or more selectively-removable support shelves. The housing may extend along a vertical direction from a top portion to a bottom portion. The housing may define a preservation chamber. The refrigeration system may be in thermal communication with the housing to draw heat therefrom. The selectively-removable support shelves may be movably positioned within the preservation chamber and define one or more discrete sub-chambers within the preservation chamber.

19 Claims, 6 Drawing Sheets

COUNTERTOP PRODUCE-PRESERVATION DEVICE HAVING SELECTIVELY-REMOVABLE SHELVES

FIELD OF THE INVENTION

The present subject matter relates generally to systems for preserving produce, such as fruit or vegetables, and more particularly to stand-alone produce-preservation devices that can be mounted or positioned on a consumer countertop.

BACKGROUND OF THE INVENTION

Keeping perishable produce items, such as fruits or vegetables, fresh has been a long-standing problem for consumers. Trying to ripen certain fruits, for instance, without allowing them to quickly spoil can be a challenge for many consumers. As an example, when exposed to the ambient temperatures of a typical home environment (e.g., between 69° Fahrenheit and 75° Fahrenheit), some fruits may quickly ripen, but bacteria or mold growth may be promoted, causing the fruit to quickly spoil. In an effort to maintain freshness, many consumers store perishable produce items in a refrigerator appliance. Typical refrigerator appliances have a cabinet that defines a chilled fresh food chamber maintained at a temperature between 32° Fahrenheit and 45° Fahrenheit. In particular, one or more drawers are often provided within the fresh food chamber to hold produce at the same temperature as the rest of the chilled refrigeration chamber.

Although a typical refrigerator appliance may preserve produce longer than if it were exposed to ambient home conditions, many additional problems may be created. For example, some produce may be prevented from quickly ripening within the relatively cold conditions of a chilled fresh food chamber. Moreover, many fruits and vegetables deteriorate at such conditions (e.g., temperatures around 40° Fahrenheit). However, meats and dairy products within the fresh food chamber may deteriorate at higher temperatures above 40° Fahrenheit. Humidity levels within the chilled fresh food chamber may also accelerate deterioration of produce. Furthermore, although different fruits or vegetables may preserve better at different conditions, the chilled fresh food chamber cannot be easily or specifically adjusted to accommodate such different conditions. Still further, some produce may emit certain gases (e.g., ethylene) that cannot be controlled within a typical drawer. In some cases, such cases may undesirably affect the ripening of adjacent fruits.

For many consumers, it would be difficult, if not impossible, to have multiple different refrigerator appliances that could be set at the ideal conditions for one or more types of produce. What's more, placing produce within a large, often opaque, appliance like a refrigerator appliance may increase the likelihood that an item of produce is forgotten and allowed to spoil.

Therefore, there is a need for a food preservation system that addresses one or more of the above-identified issues.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a countertop produce-preservation device is provided. The countertop produce-preservation device may include a housing, a refrigeration system, and a plurality of selectively-removable support shelves. The housing may extend along a vertical direction from a top portion to a bottom portion. The housing may define a preservation chamber. The refrigeration system may be in thermal communication with the housing to draw heat therefrom. The plurality of selectively-removable support shelves may be movably positioned within the preservation chamber. At least one support shelf of the plurality of selectively-removable support shelves may define a discrete first sub-chamber thereabove and a discrete second sub-chamber therebelow. The at least one support shelf may include a gas-permeable layer that permits one or more gases through the gas-permeable layer between the discrete first sub-chamber and the discrete second sub-chamber.

In another exemplary aspect of the present disclosure, a countertop produce-preservation device is provided. The countertop produce-preservation device may include a housing, a refrigeration system, a first support shelf, and a second support shelf. The housing may extend along a vertical direction from a top portion to a bottom portion. The housing may define a preservation chamber. The refrigeration system may be in thermal communication with the housing to draw heat therefrom. The first support shelf may be selectively positioned within the preservation chamber. The first support shelf may include a first material and a gas-permeable layer. The gas-permeable layer may permit the passage of one or more gases therethrough. The second support shelf may be selectively positioned within the preservation chamber below the first support shelf along the vertical direction. The second support shelf may include a second material that is unique from the first material. The first support shelf may define a discrete first sub-chamber thereabove. The first support shelf and the second support shelf may define a discrete second sub-chamber therebetween. The second support shelf may define a discrete third sub-chamber therebelow.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
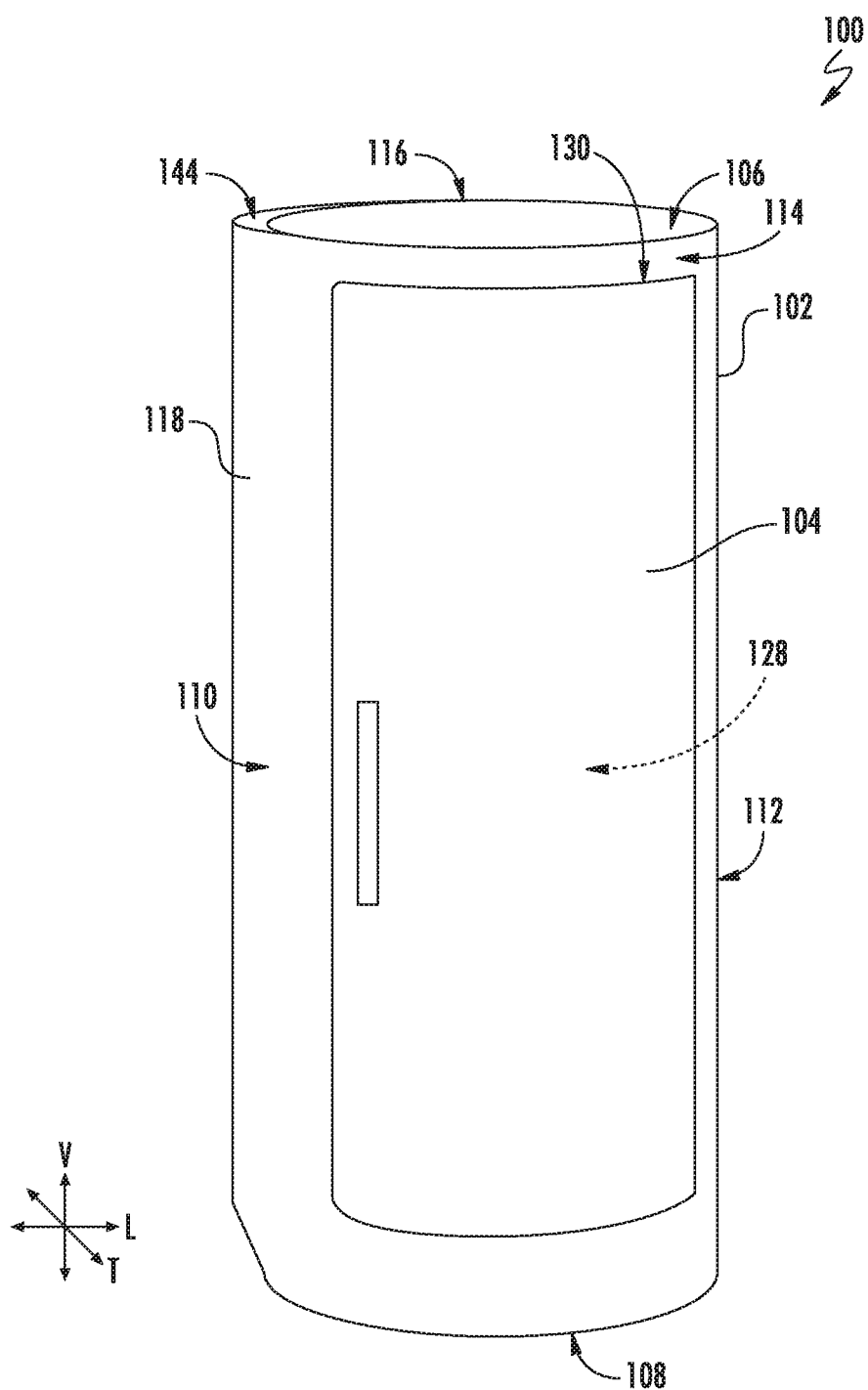
FIG. 1 provides a perspective view of a preservation device according to exemplary embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In order to aid understanding of this disclosure, several terms are defined below. The defined terms are understood to have meanings commonly recognized by persons of ordinary skill in the arts relevant to the present invention. The terms "includes" and "including" are intended to be inclusive in a manner similar to the term "comprising." Similarly, the term "or" is generally intended to be inclusive (i.e., "A or B" is intended to mean "A or B or both"). The terms "first," "second," and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows.

Figure 2:
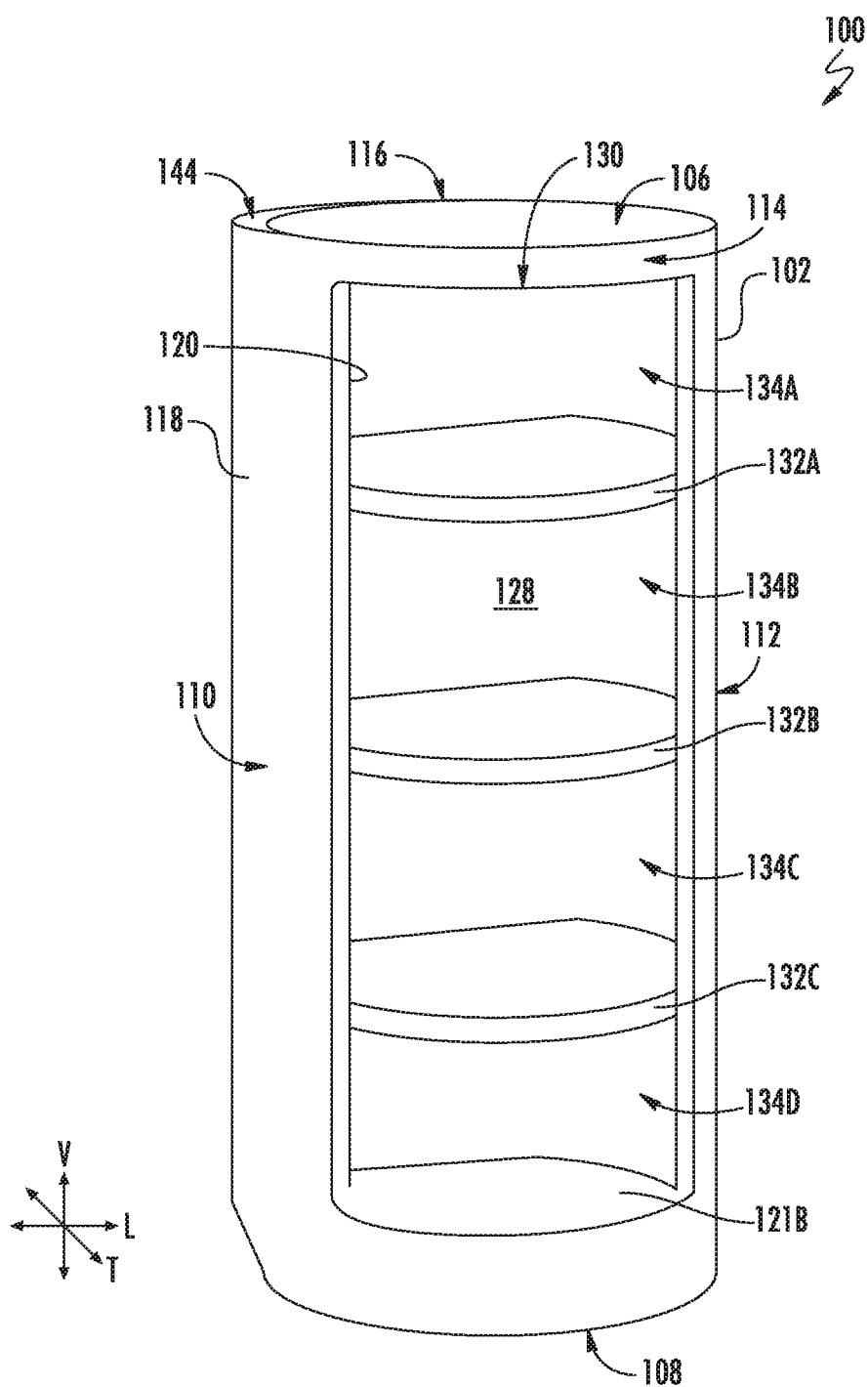
FIG. 2 provides a perspective view of the exemplary embodiment of FIG. 1, with the door removed for clarity.

Turning now to the figures, FIGS. 1 and 2 illustrate a preservation device 100 according to exemplary embodiments of the present disclosure. In particular, FIG. 1 provides a perspective view of preservation device 100 having a housing 102 to which a door 104 is movably attached. FIG. 2 provides another perspective view of preservation device 100, wherein door 104 has been removed for the purposes of clarity.

As shown, housing 102 extends along a defined vertical direction V between a top end 106 and a bottom end 108; along a defined lateral direction L between a first side 110 and a second side 112; and between a defined transverse direction T between a front end 114 and a rear end 116. The vertical direction V, the lateral direction L, and transverse direction T are each mutually-perpendicular and form an orthogonal direction system.

Generally, housing 102 includes an outer shell 118 and an inner shell 120 formed according to a suitable size and shape, for instance, to sit on a typical consumer countertop. When assembled, inner shell 120 is at least partially enclosed within outer shell 118 and defines a preservation chamber 128 to receive and store produce items therein. A produce opening 130 defined by inner shell 120 (e.g., through outer shell 118) generally permits access to preservation chamber 128. Thus, produce may be placed into (or alternately removed from) preservation chamber 128 through produce opening 130.

In some embodiments, inner shell 120 is formed, at least in part, from a conductive material (e.g., conductive metal), such as aluminum, copper, steel, etc. (including alloys thereof). As an example, at least one interior wall (e.g., back wall) of inner shell 120 may be formed from the conductive material. As another example, each interior wall of inner shell 120 may be formed from the conductive material. In additional or alternative embodiments, outer shell 118 is formed from an insulating material (e.g., a rigid insulating polymer or plastic), such as acrylic, polyethylene, polypropylene, etc.

Generally, door 104 may be movably attached to housing 102 to move between a closed position (FIG. 1) and an open position (not pictured). In the closed position, door 104 covers or spans produce opening 130 to restrict access to preservation chamber 128. By contrast, in the open position, door 104 is positioned away from produce opening 130 to permit access to preservation chamber 128 through produce opening 130 (e.g., similar to FIG. 2). In exemplary embodiments, door 104 is rotatably connected to outer shell 118 at one end or side (e.g., second side 112), as shown in FIG. 1. However, it should be understood that any other suitable position may be provided to permit selective opening and closing of preservation chamber 128.

In optional embodiments, one or more shelves 132 are positioned within housing 102. For instance, shelves 132 may be mounted to inner shell 120 within preservation chamber 128 to hold produce stored inside preservation device 100, as will be described in detail below. Optionally, multiple shelves 132 may be spaced apart from each other (e.g., along the vertical direction V). Sub-chambers 134 may thus be defined (e.g., in the vertical direction V) between adjacent shelves 132.

As used throughout the present disclosure, support shelves are indicated generally at 132 and specifically at exemplary first support shelf 132A, second support shelf 132B, and third support shelf 132C. Sub-chambers are indicated generally at 134 and specifically at exemplary first sub-chamber 134A, second sub-chamber 134B, third sub-chamber 134C, and fourth sub-chamber 134D. As an example, a first sub-chamber 134A may be defined by and above first support shelf 132A (e.g., between the first support shelf 132A and a top wall 121A—FIG. 3—of the inner shell 120). A second sub-chamber 134B may be defined by and between a first support shelf 132A and a second support shelf 132B. A third sub-chamber 134C may be defined by and below second support shelf 132B (e.g., between the second support shelf 132B and a third support shelf 132C). A fourth sub-chamber 134D may be defined by and below the third support shelf 132C (e.g., between the third support shelf 132C and a bottom wall 121B of the inner shell 120).

Although three discrete support shelves 132 and four sub-chambers 134 are shown, it is understood that additional or alternative embodiments may include more or less of each. For instance, more support shelves 132 (e.g., four or more) or less support shelves 132 (e.g., less than two) may be provided in accordance with the embodiments of the present disclosure.

Moreover, although the exemplary embodiments of FIGS. 1 and 2 illustrate preservation device 100 as defining a cylindrical preservation chamber 128 having a plurality of shelves 132 positioned therein, it is understood that any suitable form or shape may be provided.

Figure 3:
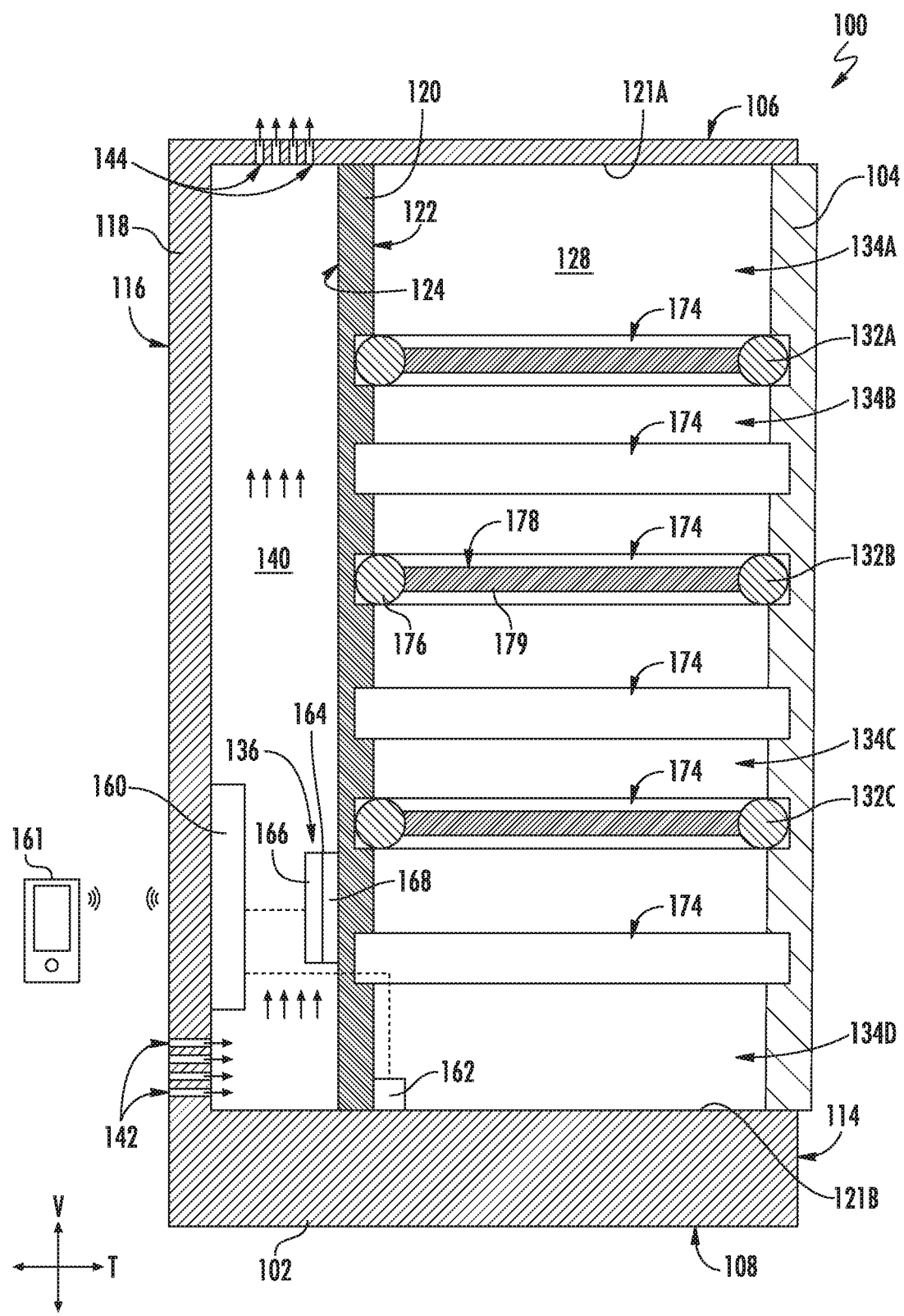
FIG. 3 provides a cross-sectional schematic view of a preservation device according to exemplary embodiments of the present disclosure.
Figure 4:
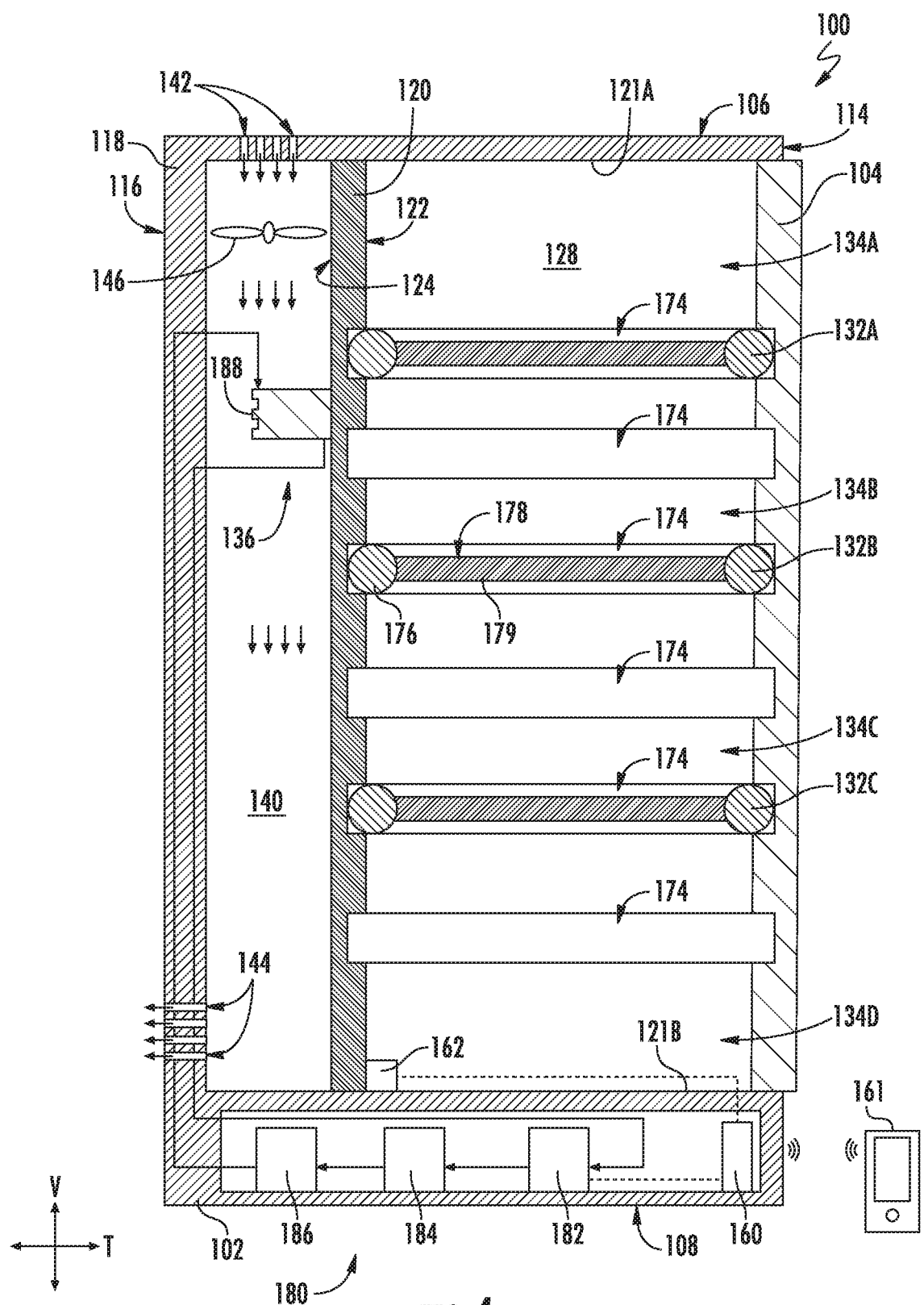
FIG. 4 provides a cross-sectional schematic view of a preservation device according to other exemplary embodiments of the present disclosure.
Figure 5:
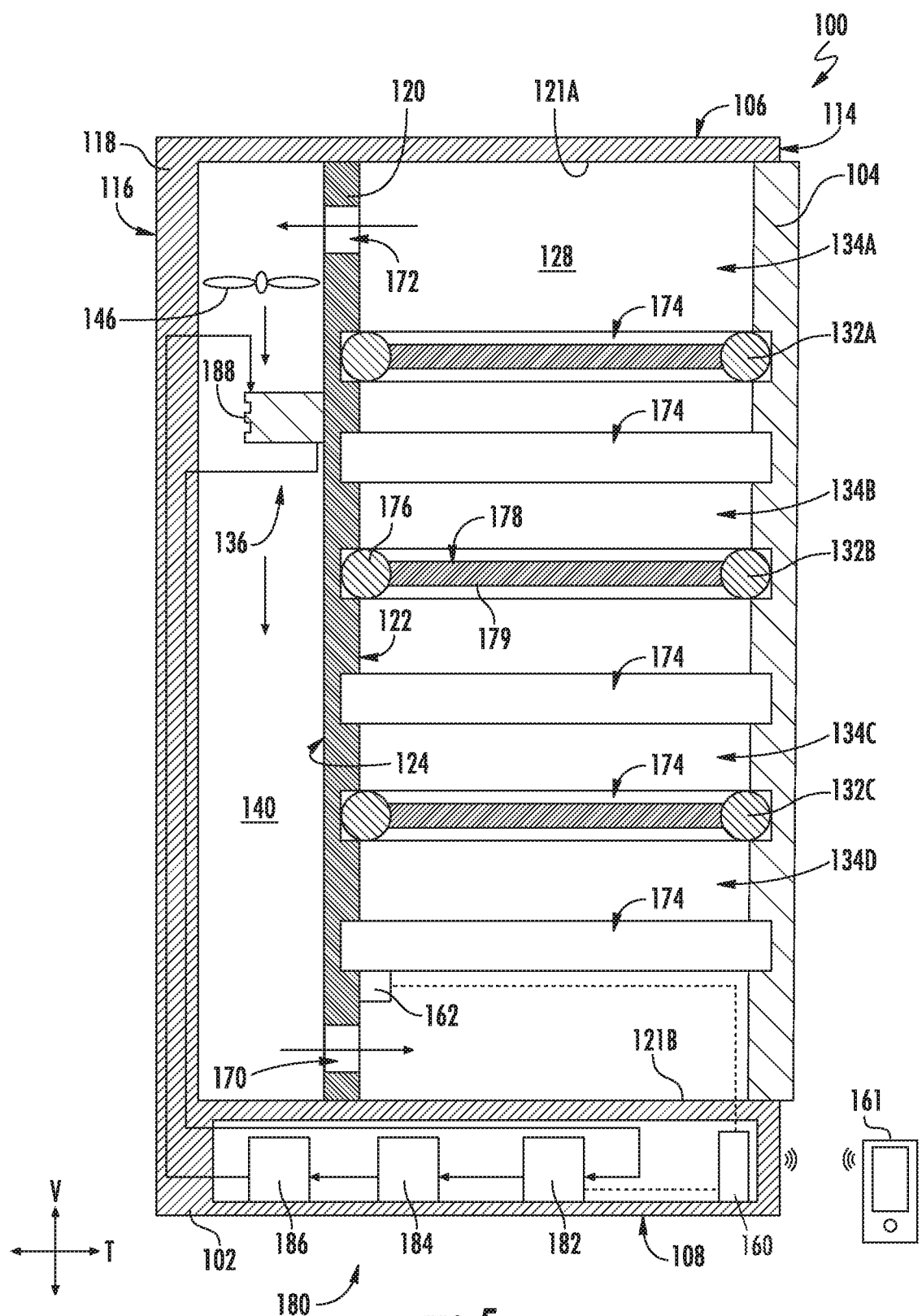
FIG. 5 provides a cross-sectional schematic view of a preservation device according to still other exemplary embodiments of the present disclosure.
Figure 6:
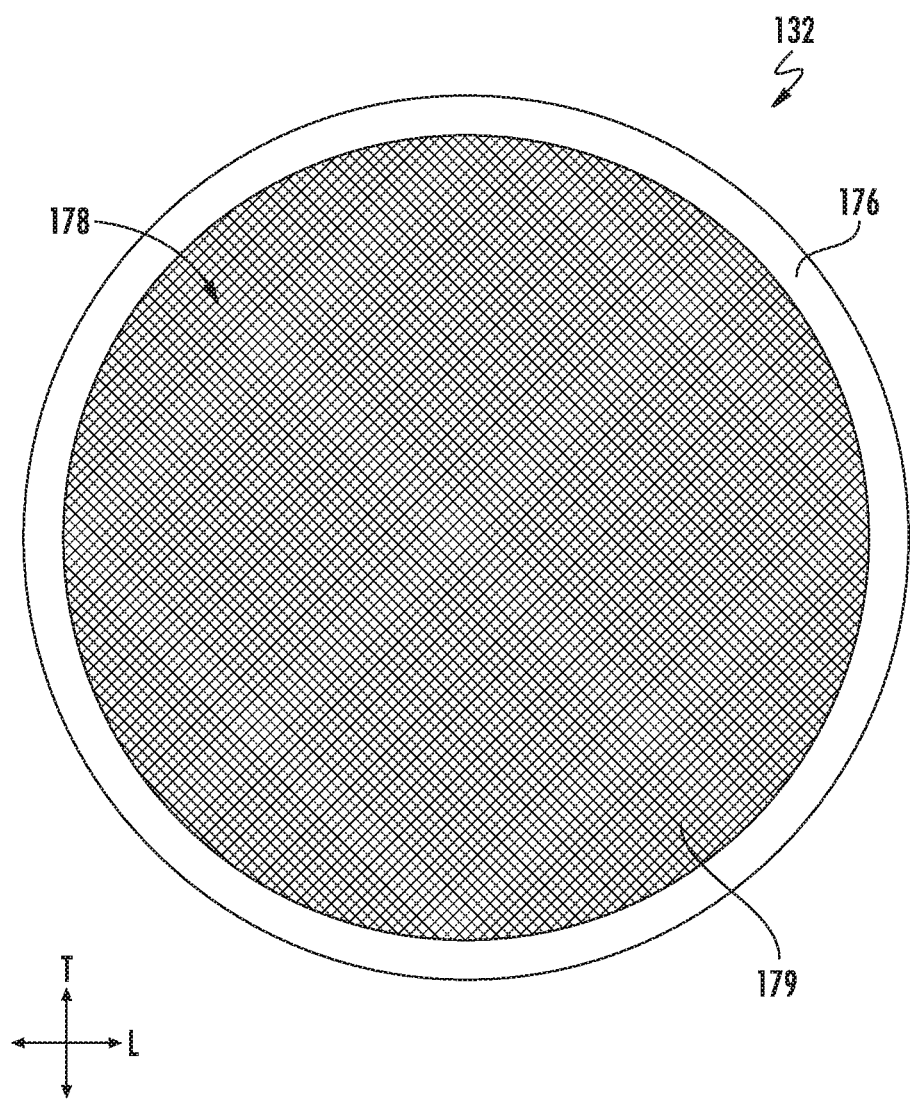
FIG. 6 provides an overhead plan view of a support shelf of an exemplary preservation device.

Turning now to FIGS. 3 through 5 generally, cross-sectional schematic side views of various exemplary embodiments of preservation device 100. As would be understood in light of the current disclosure, additional embodiments may be provided by combining one or more of the features of the separate exemplary embodiments (e.g., with respect to the elements of a cooling system 136, as discussed below).

As shown, an air passage 140 is defined between inner shell 120 and outer shell 118. As shown, inner shell 120 defines an internal surface 122 and an opposite external surface 124. Internal surface 122 is directed toward the preservation chamber 128, and the external surface 124 is directed toward the air passage 140. Thus, air passage 140 may be defined between the external surface 124 of inner shell 120 and outer shell 118 (e.g., at an internal surface of outer shell 118). In some embodiments, such as those of FIGS. 3 and 4, outer shell 118 defines a discrete air inlet 142 and air outlet 144 in fluid communication with air passage 140, thus permitting air to flow from the ambient environment and through the air passage 140 before being returned to the ambient environment (e.g., at an elevated temperature). Additional or alternative embodiments, such as those of FIG. 5, inner shell 120 defines a discrete chamber inlet 170 and chamber outlet 172, each in fluid communication between preservation chamber 128 and air passage 140.

In certain embodiments, such as those of FIGS. 3 and 4, during certain use conditions, such as when door 104 is in the closed position, preservation chamber 128 may be in fluid isolation from air passage 140. Thus, air within air passage 140 may be prevented from passing to preservation chamber 128, and vice versa.

As generally indicated in FIGS. 3 through 5, a cooling system 136 is provided in thermal communication with preservation chamber 128. For instance, at least a portion of cooling system 136 may be positioned within housing 102 (e.g., within air passage 140). In some such embodiments, cooling system 136 may be in operative communication with a controller 160. Activation of cooling system 136 may thus be contingent on, for instance, a measured temperature within preservation chamber 128.

Operation of the preservation device 100 can be generally controlled or regulated by a controller 160. For example, controller 160 is in operative communication with (e.g., electrically or wirelessly coupled to) cooling system 136. Thus, controller 160 can selectively activate and a cooling system 136 according to one or more desired operations.

In some embodiments, controller 160 is in operative communication to a user interface 161 (e.g., interface panel) or various other components, as will be described below. The user interface 161 may be provided directly on housing 102 or, alternatively, separate and independent from housing 102. For instance, the user interface 161 may be a computer (e.g., a desktop computer or a laptop), a tablet, a personal telephone (e.g., a suitable smartphone), a television (e.g., a smart television) or an independent device which functions solely to operate and communicate with the various other components of preservation device 100. For instance, the user interface 161 may communicate with the controller 160 over one or more wireless networks, such as a local area network (e.g., intranet), wide area network (e.g., internet), low power wireless networks [e.g., Bluetooth Low Energy (BLE)], or some combination thereof and can include any number of wired or wireless links. Generally, the user interface 161 may provide selections for user manipulation of the operation of preservation device 100. As an example, the user interface 161 may provide for selections between specific fruits, desired ripeness, or a desired temperature within preservation chamber 128. In response to one or more input signals (e.g., from user manipulation of the user interface 161 or one or more sensor signals), controller 160 may operate various components of preservation device 100 according to the current mode of operation.

Controller 160 may include a memory (e.g., non-transitive memory) and one or more microprocessors, CPUs or the like, such as general or special purpose microprocessors operable to execute programming instructions or microcontrol code associated with operation of preservation device 100. The memory may represent random access memory such as DRAM, or read only memory such as ROM or FLASH. In some embodiments, the processor executes programming instructions stored in memory. For certain embodiments, the instructions include a software package configured to operate preservation device 100. The memory may be a separate component from the processor or may be included onboard within the processor. Alternatively, controller 160 may be constructed without using a microprocessor, e.g., using a combination of discrete analog or digital logic circuitry (such as switches, amplifiers, integrators, comparators, flip-flops, AND gates, and the like) to perform control functionality instead of relying upon software.

Controller 160, or portions thereof, may be positioned in a variety of locations throughout preservation device 100. In example embodiments, controller 160 is located within air passage 140. In other embodiments, the controller 160 may be positioned at any suitable location within preservation device 100. Input/output ("I/O") signals may be routed between controller 160 and various operational components of preservation device 100. For example, cooling system 136 and one or more sensors (e.g., temperature sensors 162) may be in communication with controller 160 via one or more signal lines or shared communication busses.

As illustrated, controller 160 may be in operative communication with to the various components of preservation device 100 and may control operation of the various components, such as cooling system 136. Optionally, various operations, such as activation of cooling system 136 (e.g., at TEHE 164, compressor 182, or fan 146) may occur based on user input or automatically through controller 160 instruction.

In some embodiments, controller 160 includes a predetermined range or threshold for temperature in preservation chamber 128. For example, the predetermined range or threshold may be an absolute value of a contemporary temperature within preservation chamber 128 or air passage 140. Alternatively, the predetermined range or threshold could be of a value of degrees or seconds at which a contemporary temperature is below a set point value (e.g., 60° Fahrenheit).

In certain embodiments, controller 160 is configured to receive a temperature signal from temperature sensor 162. In some such embodiments, temperature sensor 162 is a suitable electrical thermistor or thermocouple disposed within preservation chamber 128. According to the received temperature signal, controller 160 is configured to determine a contemporary temperature. A contemporary temperature within preservation chamber 128 that is above the predetermined range or threshold may be indicative of an excessive temperature condition for fruit storage. A contemporary temperature that is below the predetermined range or threshold may be indicative of excessively-cooled condition within preservation chamber 128. According to the determined condition, cooling system 136 may be activated, deactivated, or adjusted.

Turning especially to FIG. 3, cooling system 136 may be provided as any suitable system having one or more selectively-activated cooling devices. For instance, in certain embodiments, cooling system 136 includes a thermo-electric heat exchanger (TEHE) 164 in thermal communication with preservation chamber 128. Generally, TEHE 164 may be any suitable solid state, electrically-driven heat pump, such as a Peltier device. TEHE 164 may include a distinct hot side 166 and cold side 168. A heat flux created between the junction of hot side 166 and cold side 168 may draw heat from the cold side 168 to the hot side 166 (e.g., as driven by an electrical current). Thus, when active, the cold side 168 of TEHE 164 may be maintained at a lower temperature than the hot side 166 of TEHE 164. In some embodiments, TEHE 164 is in operative communication with (e.g., electrically coupled to) controller 160, which may thus control the flow of current to TEHE 164.

Although TEHE 164 is illustrated as a generally solid member in FIG. 3, alternative embodiments may include one or more fin members (e.g., attached to or formed on hot side 166 or cold side 168) extending within air passage 140 or preservation chamber 128, thereby increasing the surface area of TEHE 164. For instance, one or more fins may extend from the hot side 166 within air passage 140 while one or more other fins extend from the cold side 168 within preservation chamber 128.

As shown, TEHE 164 may be attached (e.g., mechanically connected directly or indirectly) to inner shell 120. For instance, TEHE 164 may be in conductive thermal communication with inner shell 120. Moreover, TEHE 164 may be mounted in thermal and fluid communication with air passage 140. In some such embodiments, at least a portion of TEHE 164 is positioned within air passage 140. For instance, the hot side 166 may be disposed within air passage 140. Additionally or alternatively, the cold side 168 may be in contact with the external surface 124 of inner shell 120. In the exemplary embodiments of FIG. 3, TEHE 164 is disposed within air passage 140. During operations, heat may thus be drawn from preservation chamber 128 and to air passage 140 through TEHE 164. Such heat energy may be further absorbed by air flowing through air passage 140 before being motivated to air outlet 144. Notably, TEHE 164 may facilitate the heat exchange between preservation chamber 128 and air passage 140 without requiring air to be exchanged from air passage 140 to preservation chamber 128.

Turning especially to FIGS. 4 and 5, additional or alternative embodiments of cooling system 136 include a sealed refrigerant assembly 180 for executing a vapor compression cycle. As shown, sealed refrigerant assembly 180 includes a compressor 182, a condenser 184, an expansion device 186, and at least one evaporator 188 connected in fluid series and charged with a refrigerant. As will be understood by those skilled in the art, sealed refrigerant assembly 180 may include additional or fewer components (e.g., additional evaporators) mounted within, for example, housing 102.

Within sealed refrigerant assembly 180, gaseous refrigerant flows into compressor 182, which operates to increase the pressure of the refrigerant. This compression of the refrigerant raises its temperature, which is lowered by passing the gaseous refrigerant through condenser 184. Within condenser 184, heat exchange (e.g., with ambient air) takes place so as to cool the refrigerant and cause the refrigerant to condense to a liquid state.

Expansion device 186 (e.g., a valve, capillary tube, or other restriction device) receives liquid refrigerant from condenser 184. From expansion device 186, the liquid refrigerant enters evaporator 188. In some embodiments, such as the embodiments of FIGS. 4 and 5, evaporator 188 is positioned within air passage 140. Upon exiting expansion device 186 and entering evaporator 188, the liquid refrigerant drops in pressure and vaporizes. Due to the pressure drop and phase change of the refrigerant, evaporator 188 is cool relative to air passage 140 and preservation chamber 128. As such, cooled air is produced and absorbs heat within air passage 140 and preservation chamber 128. Thus, evaporator 188 is a heat exchanger that transfers heat from air passing over evaporator 188 to refrigerant flowing through evaporator 188. As shown, evaporator 188 may be attached (e.g., mechanically connected directly or indirectly) to a portion of inner shell 120. For instance, evaporator 188 may be conductive thermal communication with inner shell 120. However, alternative embodiments may provide evaporator 188 at a position that is spaced apart (e.g., along the transverse direction T or lateral direction L) from inner shell 120 within air passage 140. For instance, evaporator 188 may be attached or secured to outer shell 118 such that evaporator 188 is only in convective thermal communication with inner shell 120.

In some embodiments, a blower or fan 146 is included with cooling system 136. As shown, fan 146 may be in fluid communication with air passage 140. For instance, fan 146 may be mounted within outer shell 118 (e.g., along air passage 140). As illustrated in the exemplary embodiments of FIG. 4, fan 146 may be positioned downstream from air inlet 142 and upstream from air outlet 144. Air inlet 142 may be positioned below air outlet 144 along the vertical direction V. During use of such embodiments, fan 146 may rotate to motivate an airflow upward from air inlet 142 to air outlet 144 through air passage 140 (e.g., across evaporator 188). Air may thus be directed to air passage 140 from air inlet 142 before being exhausted to the ambient environment through air outlet 144.

As illustrated in the exemplary embodiments of FIG. 5, fan 146 may be positioned between an internal chamber inlet 170 and an internal chamber outlet 172 to recirculate air within preservation chamber 128. In some such embodiments, internal chamber inlet 170 is positioned below internal chamber outlet 172. During use of such embodiments, fan 146 may rotate to motivate an airflow downward through air passage 140 from internal chamber outlet 172 to internal chamber inlet 170 (e.g., across evaporator 188). Air from preservation chamber 128 may thus be directed to air passage 140 from internal chamber outlet 172 before being returned to preservation chamber 128 through internal chamber inlet 170.

Optionally, fan 146 may be provided as a variable speed fan configured to selectively vary its rotation speed and thus vary the rate (e.g., volumetric flow rate) of the airflow through air passage 140. In some embodiments, the rate of heat exchange between the preservation chamber 128 and air passage 140 is correlated to the flow rate (e.g., volumetric flow rate) of the airflow through air passage 140. Activation or speed of fan 146 may be at least partially based on the temperature within preservation chamber 128. Based upon a determined contemporary temperature, rotation of fan 146 may be increased, decreased, or maintained. Optionally, a new target speed for fan 146 may be selected by controller 160 before being transmitted to fan 146. The target speed may be determined according to a selected type of vegetable or fruit (e.g., via a predetermined look-up table, formula, or model).

Although a thermo-electric heat exchanger 164 and sealed refrigerant assembly 180 are shown in the exemplary embodiments of FIGS. 3 through 5, it is understood that any other suitable cooling components or devices may be used. For example, cooling system 136 may be configured as an evaporative cooling system having a porous evaporative medium (not pictured) within air passage 140 (e.g., upstream or downstream from a fan, such as fan 146) supplied or impregnated with a liquid coolant (e.g., water). The porous evaporative medium may be in direct contact with the inner shell 120 (e.g., at the external surface 124) or, alternatively, spaced apart from the inner shell 120. The airflow through air passage 140 may thus pass over, across, or through the porous evaporative medium. From the porous evaporative medium, the liquid coolant may vaporize and mix or entrain with the airflow to the airflow within air passage 140 before flowing to the ambient environment. Moreover, the liquid coolant may absorb heat from airflow and (optionally) inner shell 120 as it undergoes the vapor phase change. Heat may be drawn from preservation chamber 128 (e.g., through inner shell 120) as the vaporized coolant is flowed through the air passage 140.

Turning now to FIGS. 3 through 6, and as noted above, certain embodiments include one or more selectively-removable support shelves 132, which may be removed from or returned to preservation chamber 128 as desired.

In some embodiments, one or more receiving channels 174 are provided within preservation chamber 128 to each hold or brace a corresponding support shelf 132. As an example, multiple receiving channels 174 may be defined by discrete grooves defined on the internal surface 122 of inner shell 120. As another example, the receiving channels 174 may be defined by one or more tabs or inwardly-extending members mounted to internal shell 120 about preservation chamber 128. Each receiving channel 174 may be parallel to the other channels 174 and spaced apart (e.g., along the vertical direction V). Additionally or alternatively, each channel 174 may be matched to receive and complement the shape of a support shelf 132 (e.g., at a horizontal or radial extreme of a shelf frame 176 of the support shelf 132). During use, a support shelf 132 may be placed on top of (or at least partially within) a corresponding receiving channel 174. Moreover, certain support shelves 132 may be moved to/from different channels 174. Thus, the support shelves 132 may be selectively moved or adjusted to different arrangements (e.g., as desired by a user) within preservation chamber 128. Notably, one of more of the sub-chambers 134 may be adjusted (e.g., increased or decreased in volume) or merged with another sub-chamber 134 by changing the position of one or more of the support shelves 132 (e.g., moving one or more of the support shelves 132 to a different receiving channel 174 or removing one or more support shelves 132 from preservation chamber 128).

Generally, each support shelf 132 includes a shelf frame 176 and a top head 178 spanning across or between shelf frame 176. For example, top head 178 may extend horizontally (i.e., perpendicular to the vertical direction V) when the corresponding support shelf 132 is mounted within preservation chamber 128. Produce, such as fruit or vegetables, may thus rest on top head 178 (e.g., as support shelf 132 rests on/within a corresponding receiving channel 174).

In certain embodiments, shelf frame 176 extends about or defines a perimeter (e.g., horizontal or radial extreme) of support shelf 132. For example, shelf frame 176 may be formed as an annular member (e.g., annulus ring). Top head 178 may thus extend across the circular aperture defined by shelf frame 176. In some embodiments, when support shelf 132 is mounted within preservation chamber 128, shelf frame 176 sealingly engages a portion of inner shell 120. For instance, shelf frame 176 may contact (e.g., directly or indirectly) a portion of internal surface 122. When door 104 is in the closed position, shelf frame 176 may similarly contact an inner surface of door 104 that is grooved to complement shelf frame 176 (as illustrated) or, alternatively, flat. In turn, various gases within preservation chamber 128 (e.g., oxygen, nitrogen, or ethylene) may be restricted or prevented from passing between shelf frame 176 and internal surface 122, as well as door 104.

In optional embodiments, shelf frame 176 is provided as a resiliently bendable structure (e.g., non-rigid). For instance, shelf frame 176 may be formed from one or more elastic material (e.g., silicone, spring steel, etc.) to selectively return to a default shape (e.g., as shown in FIGS. 3 through 6) after being bent or deformed. Thus, shelf frame 176 may be configured to maintain its default shape within preservation chamber 128. When adding or removing support shelf 132 from preservation chamber 128, shelf frame 176 may be bent or otherwise deformed to pass through produce opening 130 and into preservation chamber 128. Within preservation chamber 128 (e.g., when seated within a receiving channel 174), shelf frame 176 may return to its default shape. Top head 178 may also be non-rigid to accommodate the deformation to shelf frame 176. Alternatively, however, shelf frame 176 or top head 178 may be rigid members configured to match or complement the size and shape of preservation chamber 128 (e.g., at the channels 174).

In some embodiments, one or more of the support shelves 132 (e.g., a first shelf) include a gas-permeable layer 179. In particular, all or some of top head 178 may be provided as the gas-permeable layer 179. Gas-permeable layer 179 may include one or more porous fabric materials (e.g., cotton, woven nylon, neoprene, etc.). Optionally, gas-permeable layer 179 may be formed as an open lattice or mesh having a plurality of vertical apertures that freely permit oxygen, nitrogen, and ethylene therethrough. Produce stored in one sub-chamber 134 may thus direct one or more gases (e.g., ethylene emitted by produce therein) to another sub-chamber 134.

In certain embodiments, gas-permeable layer 179 is configured to permit certain gases (e.g., oxygen or nitrogen) therethrough while still preventing or restricting other gases (e.g., ethylene) from passing through gas-permeable layer 179. Thus, when mounted within preservation chamber 128, the permitted gases may pass through gas-permeable layer 179 (e.g., along the vertical direction V) and between adjacent sub-chambers 134. For example, the permitted gases may pass between the first sub-chamber 134A and the second sub-chamber 134B while the other restricted gases are prevented from making a similar transfer between the first sub-chamber 134A and the second sub-chamber 134B.

In some such embodiments, gas-permeable layer 179 is provided as an ethylene-sealed layer (e.g., formed from a dense fabric of tightly-woven nylon or neoprene) halting the passage of ethylene therethrough. In other embodiments, top head 178 is provided as an ethylene-scavenging layer. The ethylene-scavenging layer may be formed from a permeable fabric (e.g., cotton) impregnated with one or more suitable ethylene-scavenging materials (e.g., potassium permanganate, clay, zeolite, or mineral oxide powders) to absorb ethylene gas after it passes to gas-permeable layer 179. As an example, a gas-permeable layer 179 may be provided with the second support shelf 132B as an ethylene-sealed layer or an ethylene scavenging layer. During use, ethylene gas may thus be prevented from passing from the third sub-chamber 134C to the first and second sub-chambers 134A, 134B as it is halted or absorbed at the top head 178 of the second support shelf 132B.

In further additional or alternative embodiments, one or more of the support shelves 132 may be formed as solid members from non-porous materials (e.g., one or more metals or natural polymers). For example, such support shelves 132 may be formed as solid non-permeable members to halt certain gases (e.g., oxygen, nitrogen, and ethylene) and prevent those gases from passing therethrough from one sub-chamber 134 to another sub-chamber 134. For example, shelf frame 176 and top head 178 may be formed from non-permeable materials as solid non-permeable structures. Adjacent sub-chambers 134 separated by such solid non-permeable support shelves 132 may be in fluid isolation from each other. Produce stored in one sub-chamber 134 may thus be prevented from fluid communication with produce stored in another sub-chamber 134.

It is noted that the plurality of support shelves 132 may each be provided as substantially similar or, alternatively, unique members. For instance, as unique members, at least one support shelf 132 (e.g., a first support shelf) may include a first material for its corresponding top head 178; such as an open material, ethylene-scavenging material, or ethylene-sealed material. Another support shelf 132 (e.g., a second support shelf) may include a second material for its corresponding top head 178 that is unique from the first material; such as another of the open material, ethylene-scavenging material, or ethylene-sealed material. During use, the support shelves 132 may thus be advantageously and selectively moved to adjust or control the gases that may be retained within one or more of the sub-chambers 134. The reduction or concentration of ethylene (e.g., as emitted by certain fruits or vegetables) may respectively restrict or promote the ripening of produce within the preservation chamber 128. Notably, a user may arrange or move the support shelves 132 to selectively control or influence the ripening of produce within select sub-chambers 134. Optionally, the controller 160 may instruct the user of the optimum position of certain support shelves 132 (e.g., based on an input type of produce, desired ripeness of the produce, desired temperature, desired humidity, etc.).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A countertop produce-preservation device comprising:
   a housing extending along a vertical direction from a top portion to a bottom portion, the housing defining a preservation chamber;
   a refrigeration system comprising a solid state, electrically-driven heat pump in thermal communication with the housing to draw heat therefrom; and
   a plurality of selectively-removable support shelves movably positioned within the preservation chamber, wherein at least one support shelf of the plurality of selectively-removable support shelves defines a discrete first sub-chamber thereabove and a discrete second sub-chamber therebelow, and wherein the at least one support shelf comprises a gas-permeable layer permitting one or more gases through the gas-permeable layer between the discrete first sub-chamber and the discrete second sub-chamber,
   wherein a further support shelf of the plurality of selectively-removable support shelves is spaced apart from the at least one support shelf along the vertical direction, wherein the further support shelf defines a discrete third sub-chamber spaced apart from the discrete first and second sub-chambers along the vertical direction, and wherein the at least one support shelf comprises a first material, and wherein the further support shelf comprises a second material that is unique from the first material.

2. The countertop produce-preservation device of claim 1, wherein the housing comprises an inner shell defining the preservation chamber, wherein the at least one support shelf of the plurality of selectively-removable support shelves comprises a shelf frame positioned in sealed engagement with the inner shell.

3. The countertop produce-preservation device of claim 2, further comprising a door movably attached to the housing to move between an open position restricting access to the preservation chamber and an open position permitting access to the preservation chamber, wherein the shelf frame is positioned in sealed engagement with the door in the closed position.

4. The countertop produce-preservation device of claim 1, wherein at least one support shelf of the plurality of selectively-removable support shelves comprises a shelf frame, and wherein the gas permeable layer comprises a fabric top head extending horizontally across the shelf frame.

5. The countertop produce-preservation device of claim 4, wherein the shelf frame is resiliently bendable.

6. The countertop produce-preservation device of claim 4, wherein the shelf frame is positioned in sealed engagement with the inner shell.

7. The countertop produce-preservation device of claim 4, wherein the shelf frame comprises an annulus ring.

8. The countertop produce-preservation device of claim 1, wherein the further support shelf comprises an ethylene-sealed layer halting a passage of ethylene between the discrete third sub-chamber and the discrete first and second sub-chambers.

9. The countertop produce-preservation device of claim 1, wherein the further support shelf comprises an ethylene-scavenging layer absorbing ethylene between the discrete third sub-chamber and the discrete first and second sub-chambers.

10. A countertop produce-preservation device comprising:
    a housing extending along a vertical direction from a top portion to a bottom portion, the housing defining a preservation chamber;
    a refrigeration system comprising a sealed refrigerant assembly to execute a vapor compression cycle, the sealed refrigerant assembly comprising a compressor, a condenser, an expansion device, and an evaporator, the evaporator being in thermal communication with the housing to draw heat therefrom; and
    a first support shelf selectively positioned within the preservation chamber, the first support shelf comprising a first material and a gas-permeable layer, the gas-permeable layer permitting a passage of one or more gases therethrough; and
    a second support shelf selectively positioned within the preservation chamber below the first support shelf along the vertical direction, the second support shelf comprising a second material that is unique from the first material,
    wherein the first support shelf defines a discrete first sub-chamber thereabove, wherein the first support shelf and the second support shelf define a discrete second sub-chamber therebetween, and wherein the second support shelf defines a discrete third sub-chamber therebelow.

11. The countertop produce-preservation device of claim 10, wherein the housing comprises an inner shell defining the preservation chamber, wherein the first support shelf comprises a shelf frame positioned in sealed engagement with the inner shell.

12. The countertop produce-preservation device of claim 10, further comprising a door movably attached to the housing to move between an open position restricting access to the preservation chamber and an open position permitting access to the preservation chamber, wherein a shelf frame is positioned in sealed engagement with the door in the closed position.

13. The countertop produce-preservation device of claim 10, wherein the first support shelf comprises a shelf frame, and wherein the gas permeable layer comprises a fabric top head extending horizontally across the shelf frame.

14. The countertop produce-preservation device of claim 13, wherein the shelf frame is resiliently bendable.

15. The countertop produce-preservation device of claim 13, wherein the shelf frame is positioned in sealed engagement with the inner shell.

16. The countertop produce-preservation device of claim 13, wherein the shelf frame comprises an annulus ring.

17. The countertop produce-preservation device of claim 10, wherein the second support shelf comprises an ethylene-sealed layer halting a passage of ethylene between the discrete third sub-chamber and the discrete first and second sub-chambers.

18. The countertop produce-preservation device of claim 10, wherein the second support shelf comprises an ethylene-scavenging layer absorbing ethylene between the discrete third sub-chamber and the discrete first and second sub-chambers.

19. A countertop produce-preservation device comprising:

a housing extending along a vertical direction from a top portion to a bottom portion, the housing defining a preservation chamber;

a cooling system in thermal communication with the housing to draw heat therefrom;

a plurality of selectively-removable support shelves movably positioned within the preservation chamber, wherein at least one support shelf of the plurality of selectively-removable support shelves defines a discrete first sub-chamber thereabove and a discrete second sub-chamber therebelow, and wherein the at least one support shelf comprises a gas-permeable layer permitting one or more gases through the gas-permeable layer between the discrete first sub-chamber and the discrete second sub-chamber, wherein a further support shelf of the plurality of selectively-removable support shelves is spaced apart from the at least one support shelf along the vertical direction, wherein the further support shelf defines a discrete third sub-chamber spaced apart from the discrete first and second sub-chambers along the vertical direction, and wherein the at least one support shelf comprises a first material, and wherein the further support shelf comprises a second material that is unique from the first material.

* * * * *